US009396570B2

(12) United States Patent
Hayashi

(10) Patent No.: US 9,396,570 B2
(45) Date of Patent: Jul. 19, 2016

(54) IMAGE PROCESSING METHOD TO SUPERIMPOSE ITEM IMAGE ONTO MODEL IMAGE AND IMAGE PROCESSING DEVICE THEREOF

(71) Applicant: Rakuten, Inc., Shinagawa-ku, Tokyo (JP)

(72) Inventor: Yasuyuki Hayashi, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 12 days.

(21) Appl. No.: 14/129,501

(22) PCT Filed: Dec. 28, 2012

(86) PCT No.: PCT/JP2012/084169
§ 371 (c)(1),
(2) Date: Dec. 26, 2013

(87) PCT Pub. No.: WO2014/103045
PCT Pub. Date: Jul. 3, 2014

(65) Prior Publication Data
US 2015/0317811 A1 Nov. 5, 2015

(51) Int. Cl.
*G06T 11/00* (2006.01)
*G06T 11/60* (2006.01)
*G06T 1/00* (2006.01)

(52) U.S. Cl.
CPC ............ *G06T 11/60* (2013.01); *G06T 1/0007* (2013.01); *G06T 11/00* (2013.01)

(58) Field of Classification Search
None
See application file for complete search history.

(56) References Cited

U.S. PATENT DOCUMENTS

| 8,655,053 | B1* | 2/2014 | Hansen | G06Q 30/0241 382/154 |
| 9,129,404 | B1* | 9/2015 | Wagner | G06T 3/40 |
| 2003/0114972 | A1* | 6/2003 | Takafuji | B60R 21/0134 701/45 |
| 2009/0059030 | A1* | 3/2009 | Hoshii | G06T 3/0093 348/222.1 |
| 2010/0030578 | A1* | 2/2010 | Siddique | G06Q 10/0637 705/3 |

(Continued)

FOREIGN PATENT DOCUMENTS

| JP | 2002140581 A | 5/2002 |
| JP | 2005242566 A | 9/2005 |
| JP | 201273961 A | 4/2012 |

OTHER PUBLICATIONS

Peter Eisert, Christian Jacquemin, Anna Hilsmann, Virtual Jewel Rendering for Augmented Reality Environments, 2010, Proceedings of the 2010 IEEE 17th International Conference on Image Processing, pp. 1813-1816.*

(Continued)

*Primary Examiner* — Michael J Cobb
(74) *Attorney, Agent, or Firm* — Sughrue Mion, PLLC

(57) ABSTRACT

An image processing device includes an item image acquisition unit that acquires an item image, a model image acquisition unit that acquires a model image, a correction unit that corrects a tilt of a correction target region being at least a part of an item region being a region where an item is shown in the item image so that a direction of a center of gravity position of the correction target region with respect to a support position of the correction target region is along a direction of gravity in the model image, and an output unit that outputs the model image and the item region so that the item region is displayed superimposed on the model image. A composite image closer to the state where the item is actually worn on the human body is thereby provided.

9 Claims, 16 Drawing Sheets

(56) References Cited

U.S. PATENT DOCUMENTS

| | | | | |
|---|---|---|---|---|
| 2010/0169059 | A1* | 7/2010 | Thomas-Lepore | G06F 17/50 703/1 |
| 2013/0038700 | A1* | 2/2013 | Horita | G02B 7/36 348/47 |
| 2013/0063550 | A1* | 3/2013 | Ritchey | G03B 37/00 348/36 |
| 2013/0141607 | A1* | 6/2013 | Anabuki | H04N 5/23219 348/222.1 |
| 2014/0002492 | A1* | 1/2014 | Lamb | G06F 1/163 345/633 |
| 2014/0368869 | A1* | 12/2014 | Park | G06F 3/125 358/1.15 |
| 2015/0363679 | A1* | 12/2015 | Kanamaru | G06K 15/1867 358/1.2 |

OTHER PUBLICATIONS

Michael Keckeisen Physical Cloth Simulation and Applications for the Visualization, Virtual Try-On, and Interactive Design of Garments, 2005, Dissertation, Eberhard-Karls-Universität Tübingen, Tübingen, Germany.*

Jurgen Strum, Deep Learning for Virtual Shopping, 2015, Re-work, San Francisco, CA, retrieved from <http://jsturm.de/publications/data/sturm2015_deeplearning_sf.pdf>, accessed Aug. 26, 2015.*

P. Eisert, P. Fechteler, J. Rurainsky, 3-D Tracking of Shoes for Virtual Mirror Applications, 2008, Proceedings of the 2008 IEEE Conference on Computer Vision and Pattern Recognition, pp. 1-6.*

Dragonjools, The Beadful Life @ BeadFX: Beginner Jewelry Making: Earring Talk, 2011, <http://beadfx.blogspot.com/2011/03/beginner-jewelry-making-earring-talk.html>, accessed Aug. 26, 2015.*

Jérémie Allard et al., SOFA—an Open Source Framework for Medical Simulation. 2007, MMVR 15—Medicine Meets Virtual Reality, IOP Press, 125, pp. 13-18, 2007, Studies in Health Technology and Informatics. <inria-00319416>.*

BrilliantAether, Earrrings, Apr. 2012, retrieved from <https://web.archive.org/web/20120418111002/http://brilliantaether.com/12-earrings>, accessed Aug. 26, 2015.*

"VIEWTRY", URL: http://www.viewtry.com/, Dec. 17, 2012.

Decision of Allowance dated Apr. 6, 2013 issued in Japanese Application No. 2013-509769.

International Preliminary Report on Patentability of PCT/JP2012/084169, dated Jul. 9, 2015.

* cited by examiner (a) P₁, I₁

| ITEM ID | SIZE | |
|---|---|---|
| | HEIGHT(cm) | WIDTH(cm) |
| M1 | H1 | W1 |
| M2 | H2 | W2 |
| M3 | H3 | W3 |
| M4 | H4 | W4 |
| ⋮ | ⋮ | ⋮ |

(a)

(b)

(c)

(d)

(e)

(a)

(b)

IMAGE PROCESSING METHOD TO SUPERIMPOSE ITEM IMAGE ONTO MODEL IMAGE AND IMAGE PROCESSING DEVICE THEREOF

CROSS REFERENCE TO RELATED APPLICATIONS

This application is a National Stage of International Application No. PCT/JP2012/084169 filed Dec. 28, 2012, the contents of all of which are incorporated herein by reference in their entirety.

TECHNICAL FIELD

The present invention relates to an image processing device, an image processing method, an image processing program and a computer-readable recording medium storing the program.

BACKGROUND ART

A technique to superimpose an image of an item that people wear, such as accessory, on an image of a person and display a composite image is known (for example, see Non Patent Literature 1). In this technique, an image of a selected piece of accessory is displayed superimposed on an image of a user.

CITATION LIST

Non Patent Literature

NPL1: VIEWTRY, [online], [searched on Dec. 17, 2012], Internet<URL: viewtry.com/>

SUMMARY OF INVENTION

Technical Problem

Images of items on e-commerce sites that sell items such as accessory are often made by photographing the items placed on a flat table. For items that are worn dangling from a part of the body, such as pierced earrings, earrings and necklaces, the direction in which gravity acts is different between when they are placed flat and when they are worn by a human body, and therefore the appearance such as the tilt of parts of those items is different. Further, images of items on e-commerce sites are sometimes made by photographing the whole items in a tilted position for the sake of better balancing the composition. Displaying such an item image superimposed on a model image such as a user results in an unnatural image, causing a feeling of strangeness to the user.

In view of the foregoing, an object of the present invention is to display an image of an item to be worn by a model superimposed on an image of the model in a manner that is closer to the way the item is actually worn by the model.

Solution to Problem

In order to solve the above-described problem, an image processing device according to one aspect of the present invention includes an item image acquisition means configured to acquire an item image displaying an item being accessory worn dangling down, a model image acquisition means configured to acquire a model image where a part on which the item is to be worn is shown, a correction means configured to correct a tilt of a correction target region being at least a part of an item region being a region where an item is shown in the item image so that a direction of a center of gravity position of the correction target region with respect to a support position of the correction target region is along a direction of gravity in the model image, and an output means configured to output the model image and the item region so that the item region is displayed superimposed on the model image.

An image processing method according to one aspect of the present invention is an image processing method executed by a computer, the method including an item image acquisition step of acquiring an item image displaying an item being accessory worn dangling down, a model image acquisition step of acquiring a model image where a part on which the item is to be worn is shown, a correction step of correcting a tilt of a correction target region being at least a part of an item region being a region where an item is shown in the item image so that a direction of a center of gravity position of the correction target region with respect to a support position of the correction target region is along a direction of gravity in the model image, and an output step of outputting the model image and the item region so that the item region is displayed superimposed on the model image.

An image processing program according to one aspect of the present invention causes a computer to implement an item image acquisition function to acquire an item image displaying an item being accessory worn dangling down, a model image acquisition function to acquire a model image where a part on which the item is to be worn is shown, a correction function to correct a tilt of a correction target region being at least a part of an item region being a region where an item is shown in the item image so that a direction of a center of gravity position of the correction target region with respect to a support position of the correction target region is along a direction of gravity in the model image, and an output function to output the model image and the item region so that the item region is displayed superimposed on the model image.

A computer-readable recording medium according to one aspect of the present invention is a computer-readable recording medium storing an image processing program that causes a computer to implement an item image acquisition function to acquire an item image displaying an item being accessory worn dangling down, a model image acquisition function to acquire a model image where a part on which the item is to be worn is shown, a correction function to correct a tilt of a correction target region being at least a part of an item region being a region where an item is shown in the item image so that a direction of a center of gravity position of the correction target region with respect to a support position of the correction target region is along a direction of gravity in the model image, and an output function to output the model image and the item region so that the item region is displayed superimposed on the model image.

According to the above-described aspect, the tilt of the correction target region in the item region is corrected so that the direction of the center of gravity position of the correction target region with respect to the support position of the correction target region is along the direction of gravity in the model image, and the item region where the tilt of the correction target region has been corrected is output superimposed on the model image, and therefore the image that is closer to the state the item is actually worn can be displayed. Thus, the displayed image is not unnatural, which does not cause a feeling of strangeness to a user so much.

In an image processing device according to another aspect, the correction means corrects the tilt of the correction target region being a whole part of the item region, and the support position is a position where an attachment portion of the item is shown in the item region. According to this aspect, the tilt of the item region is appropriately corrected when the item is made up of one rigid body.

In an image processing device according to another aspect, when the item includes a plurality of parts joined to each other through a joint portion in a manner that is able to swing, the correction target region is a region where at least another part is shown in an item region where an item including one part and said another part joined to each other through a joint portion is shown, and the support position is a joint end in the correction target region on a side of the one part.

According to the above aspect, when the item includes a plurality of parts joined to each other through a joint portion in a manner that is able to swing, a region where one part is shown is specified as the correction target region, and a support position in the correction target region is appropriately set. The tilt of the item region is thereby appropriately corrected when the item is made up of a plurality of parts joined to be able to swing as well, and therefore the image that is closer to the state the item is actually worn can be output.

In an image processing device according to another aspect, the correction means specifies a region in which a length of the region where an item is shown along a predetermined direction in the item image is shorter than adjacent regions in a predetermined range by at least a predetermined amount of difference as the joint portion and specifies the adjacent regions as regions where parts are shown.

According to the above aspect, a narrow part in the item image is specified as the joint portion, and adjacent regions to the joint portion are specified as regions where parts are shown. The joint portion in the item image is thereby appropriately specified.

In an image processing device according to another aspect, the image processing device further includes a specifying means configured to specify a direction of gravity in the model image based on information that can be acquired from the model image, and the correction means corrects a tilt of the correction target region based on the direction of gravity specified by the specifying means.

According to the above aspect, the direction of gravity in the model image is appropriately specified based on information acquired from the model image, and therefore a natural composite image that is closer to the state where the item is actually worn on the human body is provided.

In an image processing device according to another aspect, when an item image whose vertical direction is specified is acquired by the item image acquisition means, the correction means specifies an uppermost portion in the item region as the attachment portion. According to this aspect, the attachment portion in the item region can be specified appropriately and easily.

In an image processing device according to another aspect, the correction means adjusts a size of the item region so that a ratio of a size of a part on which the item is to be worn in the model image and a size of the item region is substantially equal to a ratio of an actual size of a part on which the item is to be worn and an actual size of the item based on a size of the part on which the item is to be worn in the model image acquired from the model image, information about the actual size of the part set in advance, a size of the item region in the item image acquired from the item image, and information about an actual size of the item stored in advance.

According to the above aspect, the item region to be superimposed is adjusted to an appropriate size in accordance with the model image. A natural composite image that does not cause a feeling of strangeness to a user so much is thereby provided.

In an image processing device according to another aspect, the output means specifies a part on which the item is to be worn in the model image by searching for the model image using a template indicating characteristics of a part on which the item is to be worn, and superimposes the item region on the model image so that a position where the attachment portion of the item is shown comes at the part on which the item is to be worn in the model image.

According to the above aspect, a part on which the item is to be worn in the model image is specified accurately, and the item region is superimposed on an appropriate position.

Advantageous Effects of Invention

According to one aspect of the present invention, it is possible to display an image of an item to be worn by a model superimposed on an image of the model in a manner that is closer to the way the item is actually worn by the model.

BRIEF DESCRIPTION OF DRAWINGS

FIG. 3 is a diagram showing an example of a screen that is displayed when an image processing device is applied to an e-commerce site or the like.

FIG. 5 is a diagram showing a configuration of an item information storage unit and an example of data stored therein.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
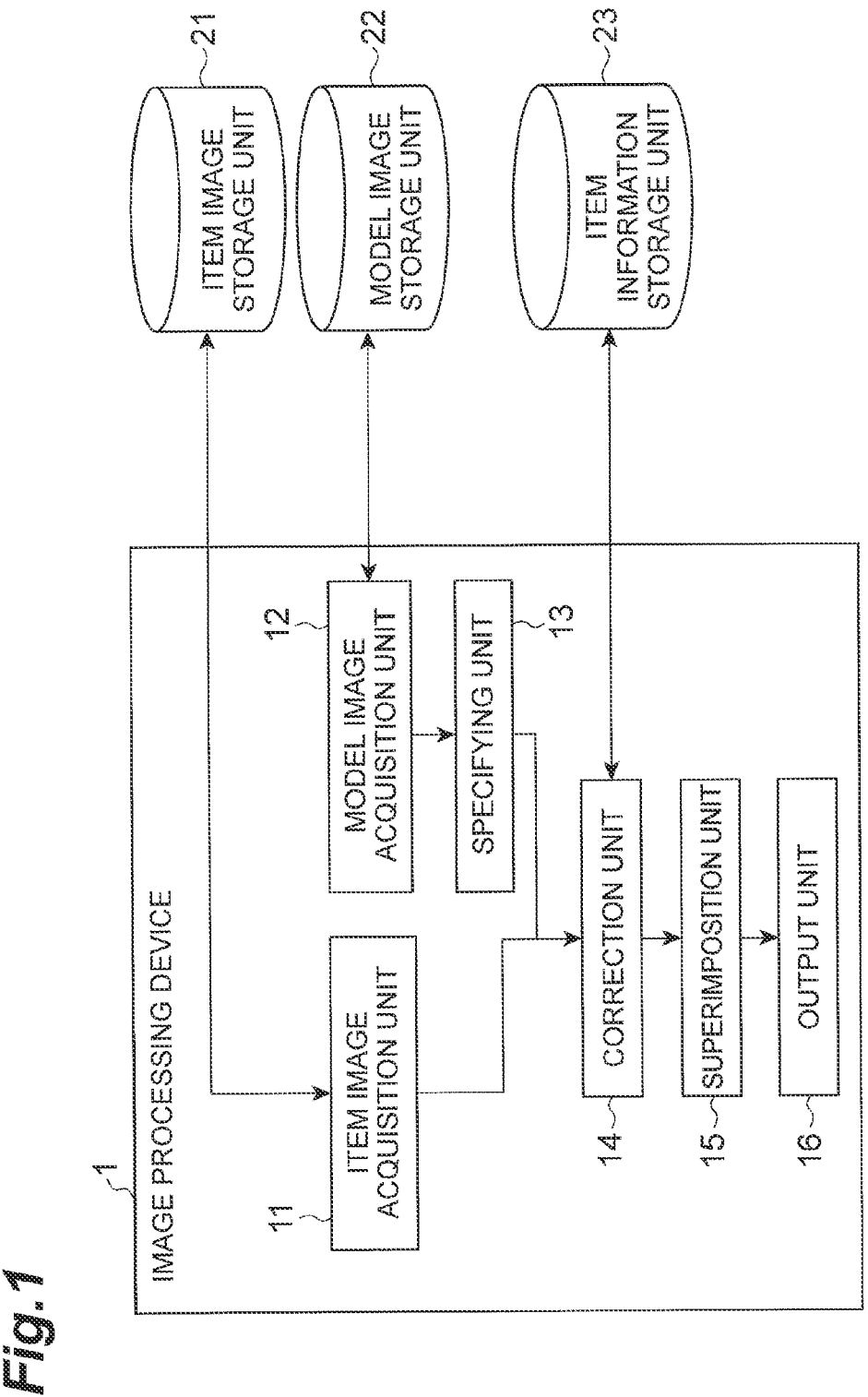
FIG. 1 is a block diagram showing a functional configuration of an image processing device.

FIG. 1 is a block diagram showing a functional configuration of an image processing device 1 according to this embodiment. The image processing device 1 is a device that superimposes an image of an item such as accessory on an image of a model and outputs a composite image. The item is a piece of accessory that is worn dangling down, for example, which includes pierced earrings, earrings, necklace charms and the like. The image processing device 1 according to this embodiment is applicable to an e-commerce site that sells items such as accessory, for example.

As shown in FIG. 1, the image processing device 1 according to this embodiment functionally includes an item image acquisition unit 11 (item image acquisition means), a model image acquisition unit 12 (model image acquisition means), a specifying unit 13 (specifying means), a correction unit 14 (correction means), a superimposition unit 15 (output means), and an output unit 16 (output means). Further, the functional units 11 to 16 of the image processing device 1 can access storage means such as an item image storage unit 21, a model image storage unit 22 and an item information storage unit 23. Note that the image processing device 1 can configured in a server that can communicate with a user terminal through a network. Further, the image processing device 1 may be configured in a device such as a smartphone or a personal computer.

Figure 2:
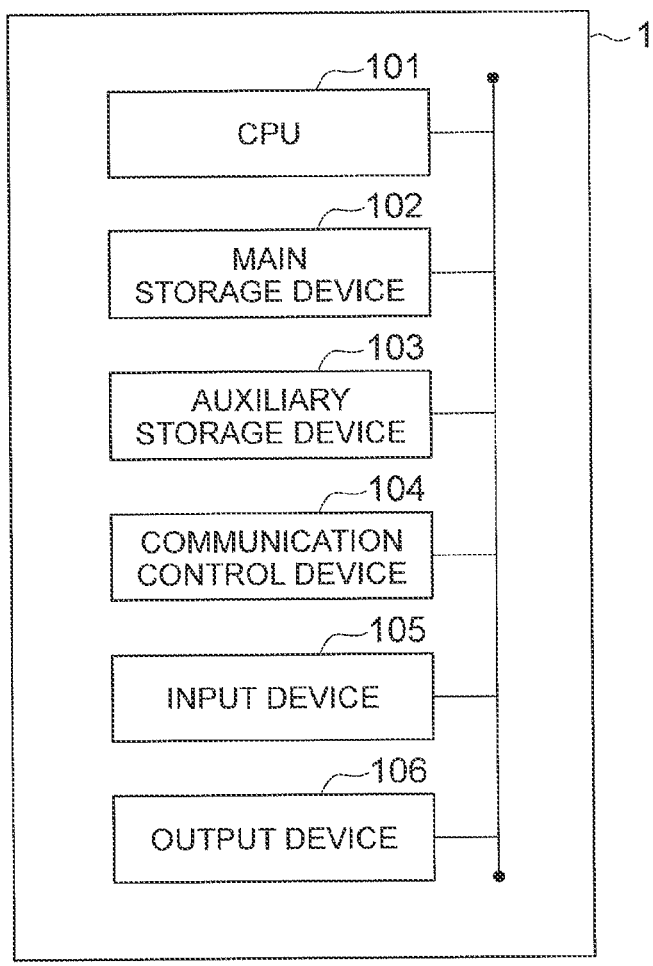
FIG. 2 is a diagram showing a hardware configuration of an image processing device.

FIG. 2 is a hardware configuration diagram of the image processing device 1. As shown in FIG. 2, the image processing device 1 is physically configured as a computer system that includes a CPU 101, a main storage device 102 such as memory like RAM and ROM, an auxiliary storage device 103 such as a hard disk, a communication control device 104 such as a network card, input device 105 such as a keyboard and a mouse, an output device 106 such as a display and the like. Note that, when the image processing device 1 is configured in a server, the image processing device 1 does not need to include the input device 105 and the output device 106.

The functions shown in FIG. 1 are implemented by loading given computer software (image processing program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

Prior to describing the functional units of the image processing device 1, the item image storage unit 21 and the model image storage unit 22 are described hereinafter. The item image storage unit 21 is a storage means that stores item images. The item images are images that show accessory sold in e-commerce sites, for example. The item image storage unit 21 may store the item images in advance.

The model image storage unit 22 is a storage means that stores model images including a part on which an item is to be worn. The model images may be stored in advance or uploaded by users. The model images show a part of a person to wear accessory, for example.

Figure 3:
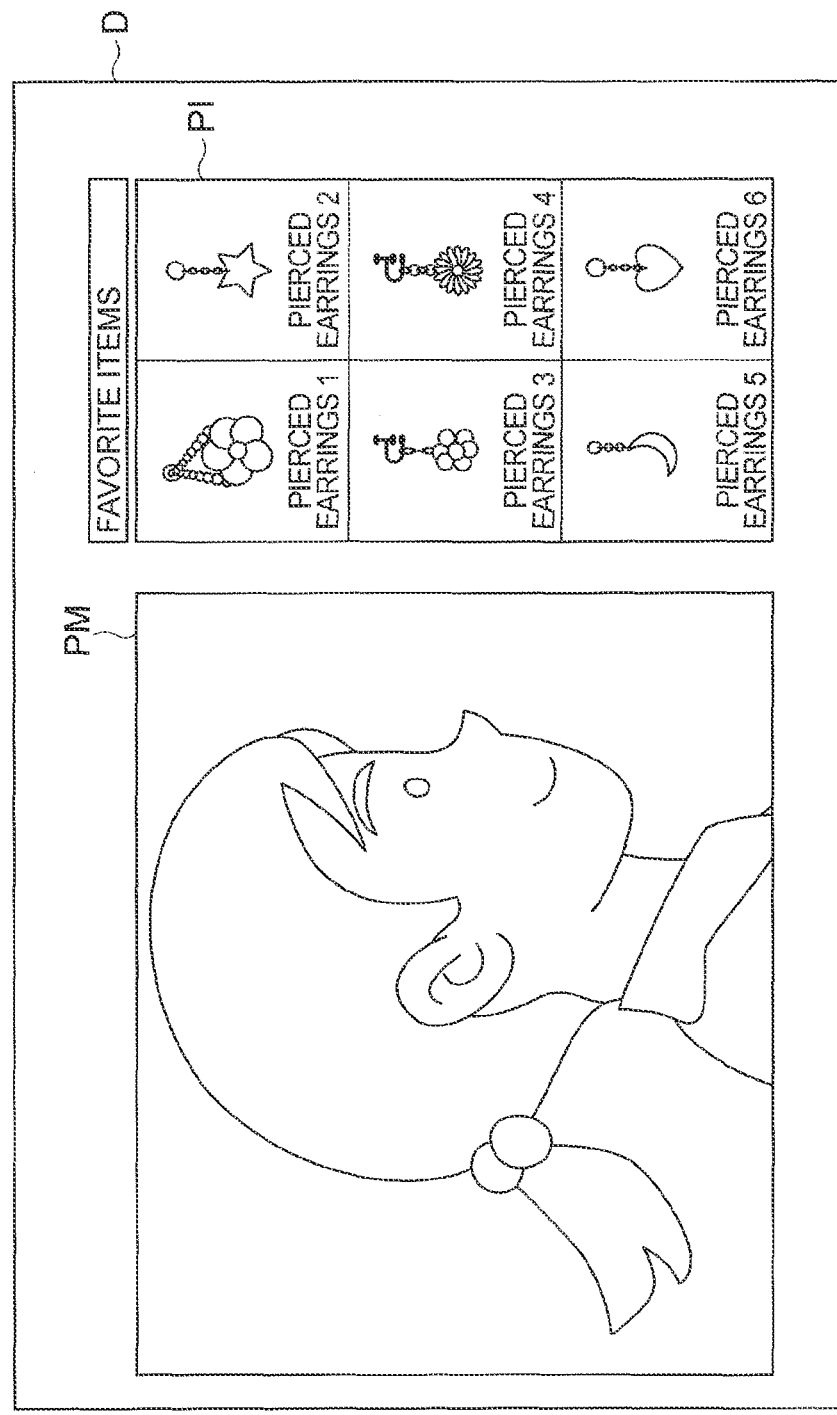

FIG. 3 is a diagram showing an example of a screen D that is displayed in the case where the image processing device 1 is applied to an e-commerce site or the like, for example. In the case where the image processing device 1 is configured in a server, the image processing device 1 outputs a plurality of item images PI acquired from the item image storage unit 21 and a model image PM acquired from the model image storage unit 22 to a user terminal with which it can communicate with through the network so that they are displayed on the screen D of a user terminal as shown in FIG. 3.

The functional units of the image processing device 1 are described hereinafter. The item image acquisition unit 11 is a unit that acquires an item image that shows an item. The item is a piece of accessory that is worn dangling down or the like and worn on a part of a model. The item such as accessory includes an attachment portion that is attached to a model and a main body (parts). The item image acquisition unit 11 acquires the item image from the item image storage unit 21.

The model image acquisition unit 12 is a unit that acquires a model image where a part on which an item is to be worn is shown. The model image acquisition unit 12 acquires the model image from the model image storage unit 22. The model image may be an image that is stored in advance or a photographed image of a user's face or the like that is uploaded by the user. Further, the model image may be an image that shows a user's face or the like that is acquired in real time.

The specifying unit 13 is a unit that specifies the direction of gravity in the model image acquired by the model image acquisition unit 12. When the vertical direction of the model image is specified, for example, the specifying unit 13 can specify the downward direction as the direction of gravity. Further, when orientation information that is acquired by an acceleration sensor of an imaging device or the like at the time of photographing is added to the model image, the specifying unit 13 can specify the direction of gravity based on the orientation information added to the model image.

Further, the specifying unit 13 may specify the direction of gravity in the model image by analyzing the model image. For example, the positions of a plurality of parts (for example, eyes, ears, nose and mouth) of the head in the model image are specified by a known method, and then the direction of gravity is specified based on the relative positional relationship of those parts. To be more specific, the specifying unit 13 first specifies the positions of the eyes and the position of the mouth and specifies the direction obtained by rotating the direction of the position of the mouth with respect to the positions of the eyes by a predetermined angle as the direction of gravity. The predetermined angle is the angle between the direction of the position of the mouth with respect to the positions of the eyes and the vertical direction of the head in a typical side face. Further, the specifying unit 13 may specify a region where an object typically along the direction of gravity is shown in an image of a model by image processing, specify the direction along which the object shown in an image of the specified region lies by image processing, and specify the specified direction as the direction of gravity.

Note that the specifying unit 13 is not an essential component in the image processing device 1 according to this embodiment. In the case where the image processing device 1 does not have the specifying unit 13, the functional units such as the correction unit 14 may specify a predetermined direction such as the downward direct in a model image as the direction of gravity.

The correction unit 14 is a unit that corrects the tilt of a correction target region, which is at least a part of an item region that is a region in which an item is shown in the item image, so that the direction of the center of gravity position of the correction target region with respect to the support position of the correction target region is along the direction of gravity in the model image. To be specific, the correction unit 14 first extracts an item region where an item is shown from an item image as preprocessing of tilt correction. Further, the correction unit 14 specifies a correction target region from the item region.

Figure 4:
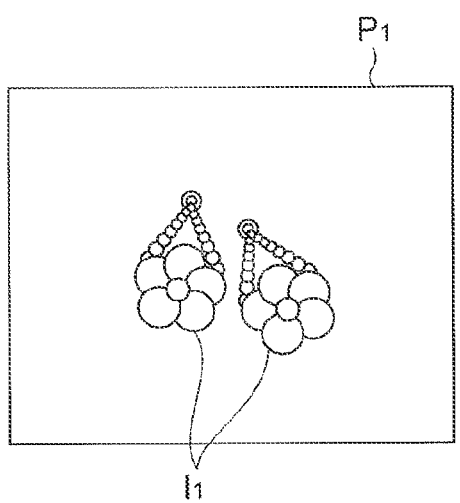
FIG. 4(a) is a diagram showing an example of an item image.
FIG. 4(b) is a diagram showing an example of specifying a correction target region.
Figure 4:
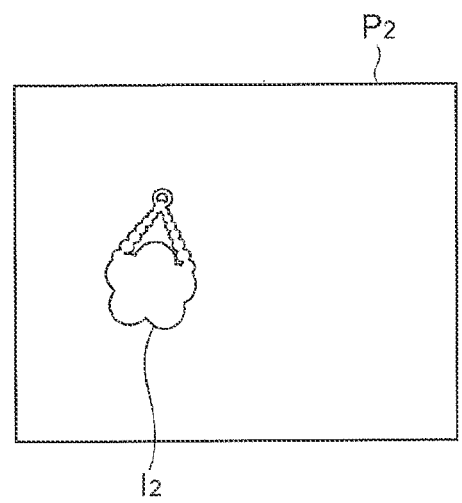

First, the correction unit 14 specifies an item region in the item image acquired by the item image acquisition unit 11 using a known image processing technique. FIG. 4(*a*) is a diagram showing an example of an item image. The correction unit 14 specifies an item region (foreground region) in which an item $I_1$ is shown from an item image $P_1$. In the case where two regions are specified, the correction unit 14 recognizes that a pair of left and right items are specified in the item image $P_1$. Then, the correction unit 14 specifies either one of the two item regions as a region for specifying the correction target region. In the case where it is set which of the right and left regions is to be the correction target region, the correction unit 14 can specify the correction target region in accordance with the setting. Further, in the case where the item is so-called stud pierced earrings, there is no difference in the shape of left and right pieces and therefore the correction unit 14 can specify any of the regions as the correction target region. Then, in the case where the item is made up of one rigid body (part) as shown in an item image $P_2$ of FIG. 4(*b*), the correction unit 14 specifies the whole part of the item region $I_2$ as the correction target region. Note that it can be determined whether the item is made up of one part or made up of a plurality of parts joined to one another using a known image processing technique such as dilation and erosion, for example. The determination is described later.

Next, the correction unit 14 adjusts the size of an item region to be superimposed on a model image. In many cases, a scale to the actual size is different between an item image and a model image, and superimposing the item region of the item image on the model image without adjusting the size in such a case results in an unnatural output image that causes a feeling of strangeness to the user. In order to prevent the output of an unnatural image, the correction unit 14 adjusts the size of the item region so that the ratio of the size of a part on which the item is to be worn in the model image and the size of the item region is substantially equal to the ratio of the actual size of a part on which the item is to be worn and the actual size of the item based on the size of the part on which the item is to be worn in the model image, information about the actual size of the part in the model that is set in advance, the size of the item region in the item image, and information about the actual size of the item that is stored in advance.

In the case where a part on which the item is to be worn in the model image is the ear, the number of pixels in height of a rectangle in which a region where the ear is shown is inscribed is acquired as the size of the part on which the item is to be worn in the model image. The region where the ear is shown can be specified by known image processing. As the information about the actual size of the part in the model that is set in advance, information (Height: 5 cm) is stored, for example.

The information about the actual size of the item is stored in the item information storage unit 23 in advance. FIG. 5 is a diagram showing the configuration of the item information storage unit 23 and an example of data stored therein. As shown in FIG. 5, the item information storage unit 23 stores the size in height and width in association with an item ID. The item ID is an identifier of an item. The correction unit 14 adjusts the size of the item region using the information about the size in either one or both of height and width.

The correction unit 14 specifies an attachment portion in the image of an item. The attachment portion is a part of an item that is worn by a model. To be specific, when the item image whose vertical direction is specified is acquired by the item image acquisition unit 11, the correction unit 14 specifies the uppermost portion in the item region of the item image as the attachment portion.

Figure 6:
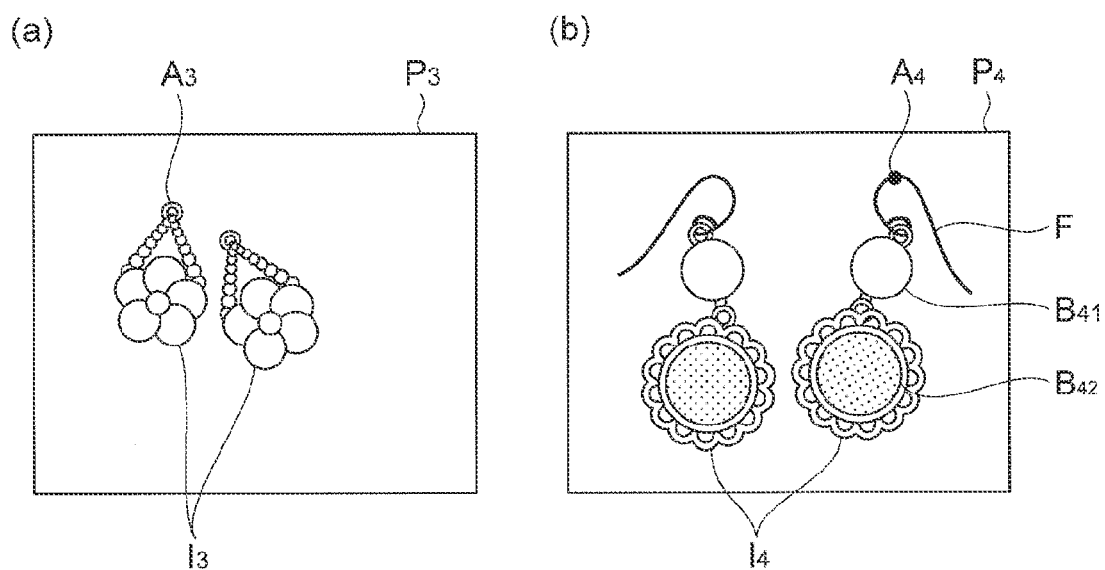
FIG. 6(a) is a diagram showing an example of specifying an attachment portion.
FIG. 6(b) is a diagram showing another example of specifying an attachment portion.

FIG. 6(*a*) is a diagram showing an example of specifying the attachment portion. It is assumed that the vertical direction of an item image $P_3$ shown in FIG. 6(*a*) is specified as its attribute. In the item image $P_3$, the image of an item $I_3$ is shown. The correction unit 14 specifies the uppermost portion $A_3$ in the image of the item $I_3$ as the attachment portion. When the coordinate axis (y-axis) is set in the vertical direction of the item image $P_3$, the correction unit 14 specifies the pixel having the largest y-coordinate value in the image of the item $I_3$ as the attachment portion. Further, in the case where an item shown in the item image is stud pierced earrings, the correction unit 14 may specify a round portion with a predetermined diameter (for example, 1.5 mm in the actual size) including the pixel having the largest y-coordinate value in the image of the item and specify the center of that portion as the attachment portion. Information as to whether the item is stud pierced earrings or not may be acquired from text information about an item that is stored in associated with an item image or may be acquired from the item information storage unit 23.

FIG. 6(*b*) is a diagram showing another example of specifying the attachment portion. An item image $P_4$ shown in FIG. 6(*b*) is an image of an item $I_4$. The item $I_4$ is pierced earrings and has a hook portion F to go through a pierced hole and a plurality of parts $B_{41}$ and $B_{42}$. The correction unit 14 specifies the uppermost portion $A_4$ in the image of the item $I_4$ as the attachment portion.

Further, in the case of specifying the attachment portion of the item $I_4$ having the hook portion F as shown in FIG. 6(*b*), the correction unit 14 may extract the hook portion F by a known image processing technique such as pattern matching, for example, and specify a portion where the curvature of the curved hook portion F is the largest as the attachment portion.

Then, the correction unit 14 specifies the specified attachment portion as at least one of support positions when the item is worn dangling from the attachment position of a model.

The correction unit 14 specifies the center of gravity position in the correction target region of the item region. Specifically, assuming that the mass is distributed uniformly over the correction target region of the item image, the correction unit 14 specifies the center of gravity position in the correction target region based on the shape of the correction target region using a known image processing technique and an analysis technique, for example.

Figure 7:
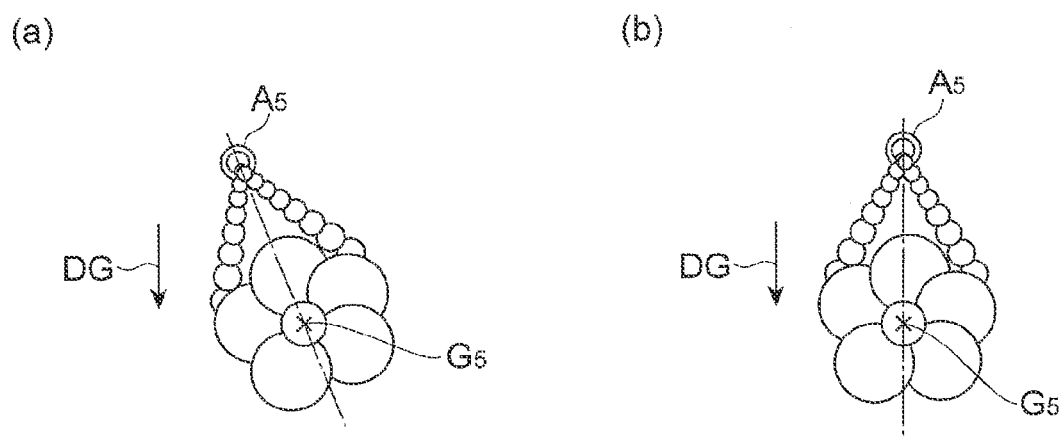
FIG. 7 is a diagram showing an example of correction of the tilt of a correction target region.

Then, the correction unit 14 corrects the tilt of the correction target region so that the direction of the center of gravity position with respect to the support position in the correction target region of the item region is along the direction of gravity in the model image. FIG. 7 is a diagram showing an example of correction of the tilt of the correction target region in the case where the whole item region is the correction target region.

As shown in FIG. 7(*a*), when a support position $A_5$ and a center of gravity position $G_5$ are specified and the direction of gravity in the model image is the direction indicated by the arrow DG, the correction unit 14 corrects the tilt of the correction target region so that the direction of the center of gravity position $G_5$ with respect to the support position $A_5$ is along the direction of gravity DG in the model image, as shown in FIG. 7(b).

The superimposition unit 15 superimposes the item region in which the correction target region is corrected by the correction unit 14 onto the model image. The superimposition unit 15 can superimpose the item region onto the model image by positioning so that the attachment portion in the item region comes at the part on which the item is to be worn in the model image. To superimpose the item region, the superimposition unit 15 specifies the part on which the item is to be worn in the model image prior to the superimposition processing.

Figure 8:
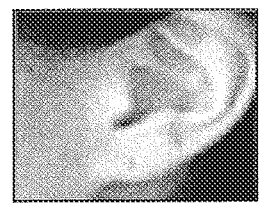
FIGS. 8(a) to 8(d) are views showing preprocessing prior to matching using a template.
FIG. 8(e) is a view showing a template representing the characteristics of a pierced hole.
Figure 8:
Figure 8:
Figure 8:
Figure 8:
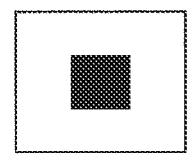

The superimposition unit 15 can specify a part on which the item is to be worn in the model image by searching for (matching) the model image using a template indicating the characteristics of a part on which the item is to be worn. FIG. 8 shows views to describe an example of processing of specifying a part on which the item is to be worn. FIGS. 8(a) to 8(d) show preprocessing prior to matching using a template. First, the superimposition unit 15 extracts an image of a part on which the item is to be worn from the model image. In the example of FIG. 8(a), the image of the ear part on which a pierced earring is to be worn is extracted. Next, as shown in FIG. 8(b), the superimposition unit 15 performs edge extraction on the image of the ear part by a known image processing technique. Then, the superimposition unit 15 performs dilation as shown in FIG. 8(c) and erosion as shown in FIG. 8(d), which are known image processing techniques, to make a pierced hole through which a pierced earring is worn apparent. The dilation and erosion are performed repeatedly in accordance with the characteristics of the image.

After that, the superimposition unit 15 performs matching on the model image in which a pierced hole is made apparent using a template indicating the characteristics of the pierced hole as shown in FIG. 8(e) and thereby specifies a part on which a pierced earring is to be worn.

Note that the superimposition unit 15 may specify a relative position that is set in advance in the extracted image of the ear part as a part on which the item is to be worn as shown in FIG. 8(a), for example. For example, the superimposition unit 15 can specify the position that is 10% the height of the extracted ear image from the lower end of the ear image and 30% the width of the ear image from the left end as a part on which the item is to be worn.

The superimposition unit 15 superimposes the item region in which the tilt of the correction target region is corrected onto the model image so that the attachment portion of the item in the item region is placed at the position on which the item is to be worn in the model image.

Figure 9:
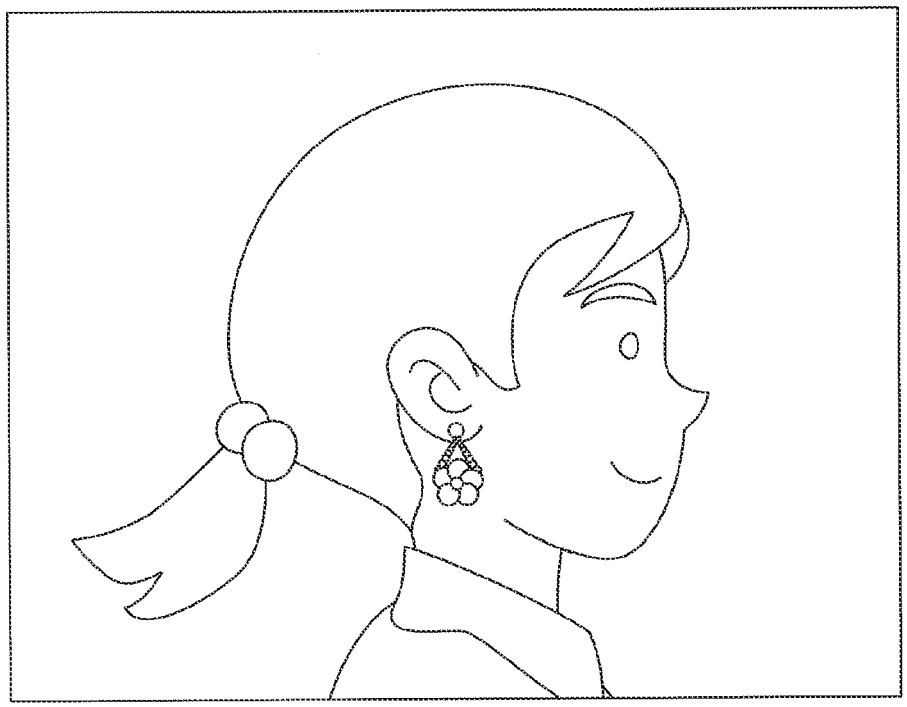
FIG. 9 is a diagram showing an example of a composite image that is output from an output unit.

The output unit 16 is a unit that outputs a model image and an item region so that the item region is displayed superimposed on the model image. To be specific, the output unit 16 outputs the model image on which the item region is superimposed by the superimposition unit 15. The output unit 16 outputs the image to a user terminal, for example. Further, the output unit 16 may output the image to a display. FIG. 9 is a diagram showing an example of the image that is output from the output unit 16. As shown in FIG. 9, the tilt of the correction target region in the item region is corrected so that the direction of the center of gravity position of the correction target region with respect to the support position of the correction target region is along the direction of gravity in the model image, and the corrected item region is superimposed on the model image so that it comes to the attachment position, and therefore the image that is closer to the state the item is actually worn by the model is output.

Figure 10:
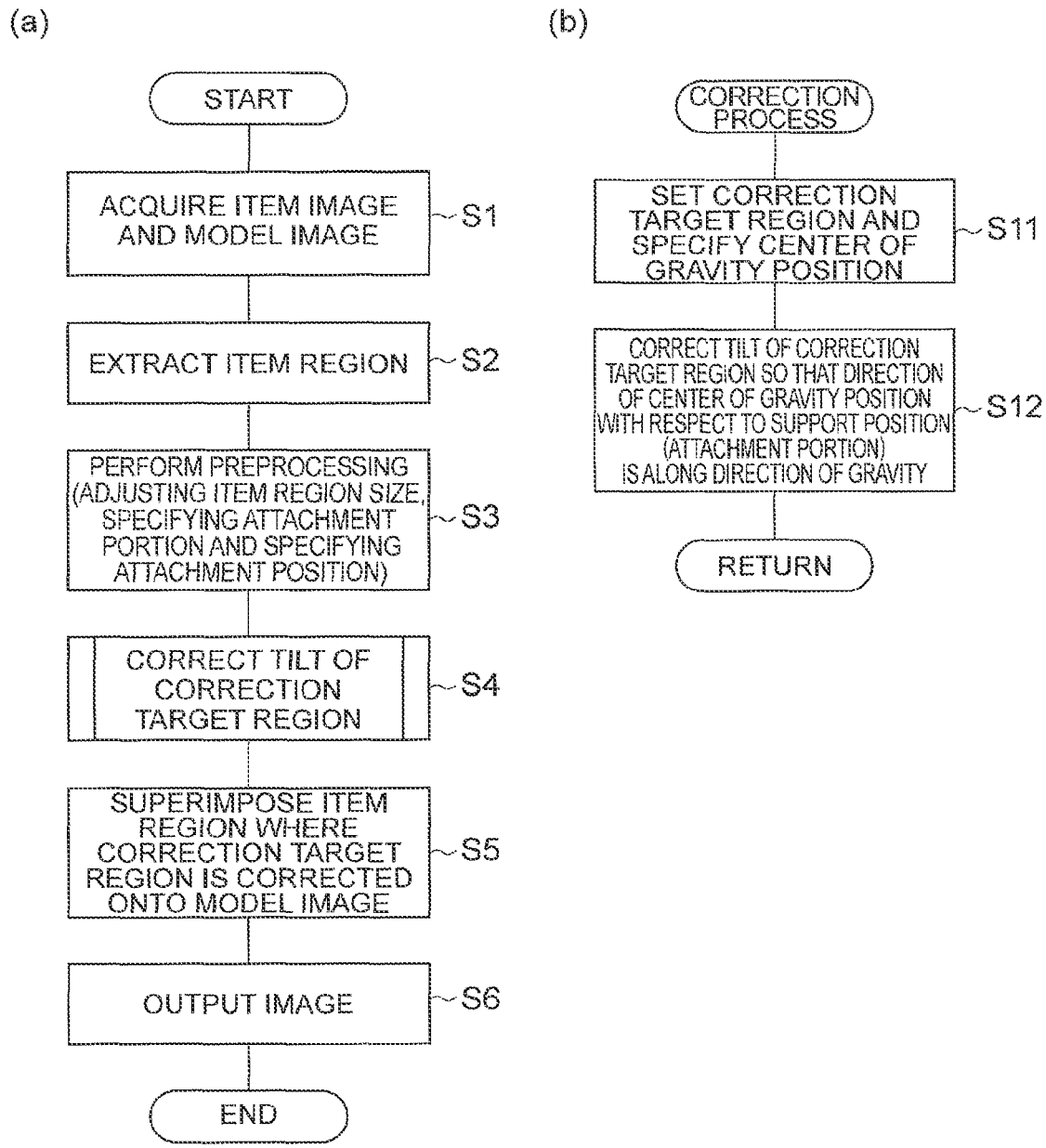
FIG. 10(a) is a flowchart showing an example of a process of an image processing method in an image processing device.
FIG. 10(b) is a flowchart showing a correction process in Step S4 of the flowchart of FIG. 10(a).

An image processing method according to this embodiment is described hereinafter with reference to FIG. 10. FIG. 10(a) is a flowchart showing an example of a process of the image processing method in the image processing device 1 shown in FIG. 1. FIG. 10(b) is a flowchart showing a correction process in Step S4 of the flowchart of FIG. 10(a) in the case where an item is a piece of accessory that is made up of one rigid body, for example.

First, the item image acquisition unit 11 acquires an item image from the item image storage unit 21. Further, the model image acquisition unit 12 acquires a model image from the model image storage unit 22 (S1). In this step, the specifying unit 13 may specify the direction of gravity in the model image acquired by the model image acquisition unit 12.

Next, the correction unit 14 extracts an item region from the item image (S2). The correction unit 14 then adjusts the size of the item region and specifies an attachment portion in the image of the item as preprocessing (S3). The correction unit 14 specifies the specified attachment portion as a support position when the item is worn dangling from the model. Further, the superimposition unit 15 specifies a part on which the item is to be worn in the model image (S3).

Then, the correction unit 14 corrects the tilt of the correction target region (S4). In this correction, the correction unit 14 extracts the whole part of the item region as the correction target region where the tilt is to be corrected. Further, the correction unit 14 specifies the center of gravity position of the correction target region using a known image processing technique and analysis technique (S11). The correction unit 14 then corrects the tilt of the correction target region so that the direction of the center of gravity position with respect to the support position in the correction target region is along the direction of gravity in the model image (S12).

Then, the superimposition unit 15 superimposes the item region where the correction target region is corrected onto the model image so that the attachment portion is placed at the part on which the item is to be worn in the model image (S5). Finally, the output unit 16 outputs the image superimposed by the superimposition unit 15 (S6).

Figure 11:
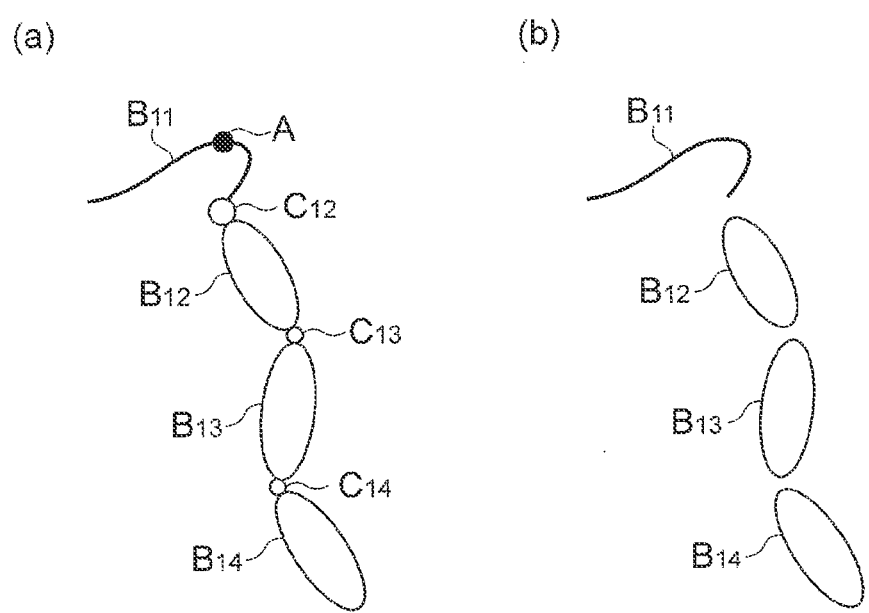
FIG. 11(a) is a diagram showing an example of a pierced earring made up of a plurality of parts.
FIG. 11(b) is a diagram showing an image of an item that is segmented into a plurality of regions as a result of dilation and erosion.

An example of correction of the tilt of an image of an item in the case where the item includes a plurality of parts that are joined through a joint portion to be able to swing around the joint portion as the point of support is described hereinbelow. FIG. 11(a) is a diagram showing an example of an item that is pierced earrings made up of a plurality of parts. As shown in FIG. 11(a), the item includes a plurality of parts $B_{11}$, $B_{12}$, $B_{13}$ and $B_{14}$. The part $B_{11}$ includes an attachment portion A. The part $B_{12}$ is joined to the part $B_{11}$ through a joint portion $C_{12}$ to be able to swing around the joint portion $C_{12}$ as the point of support. The part $B_{13}$ is joined to the part $B_{12}$ through a joint portion $C_{13}$ to be able to swing around the joint portion $C_{13}$ as the point of support. The part $B_{14}$ is joined to the part $B_{13}$ through a joint portion $C_{14}$ to be able to swing around the joint portion $C_{14}$ as the point of support. Note that, although the joint portion is shown as a small round shape in FIG. 11 for the convenience of illustration, the shape of the actual joint portion is more complex, and the joint portion is composed of a ring fixed to one part and a ring fixed to another part which are joined together, for example.

The correction unit 14 can determine whether an item is made up of one part or made up of a plurality of parts joined to one another using a known image processing technique such as dilation and erosion, for example. As shown in FIG. 11(b), in the case where the item region of the item image is segmented into a plurality of regions as a result of performing dilation and erosion on the item region, the correction unit 14 can determine that the item is made up of a plurality of parts.

Further, the correction unit 14 can specify a region that has disappeared as a result of dilation and erosion as shown in FIG. 11(b) as the joint portion. To be more specific, the correction unit 14 specifies a difference between the image shown in FIG. 11(a) and the image shown in FIG. 11(b) as the joint portion. Further, the correction unit 14 specifies each of regions segmented by dilation and erosion as a region where each of the parts is shown and specifies each region where each of the parts is shown as the correction target region. Thus, the image of an item has a plurality of correction target regions when the item is made up of a plurality of parts.

Figure 12:
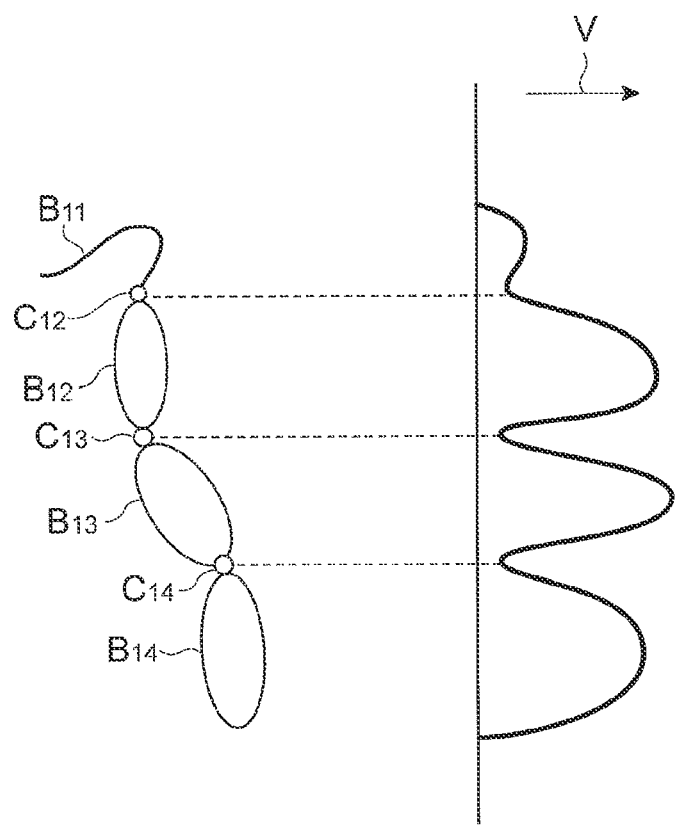
FIG. 12 is a diagram showing another example of specifying a joint portion by a correction unit.

FIG. 12 is a diagram showing another example of specifying a joint portion by the correction unit 14. The correction unit 14 can specify a region where the length of the region in which an item is shown along a predetermined direction in an item image is shorter than adjacent regions in a predetermined range by at least a predetermined amount of difference as the joint portion and specify the adjacent regions as regions where parts are shown. To be specific, when the vertical direction of an item image is specified, the correction unit 14 generates a histogram representing the number of pixels in regions of the item image distributed along the direction orthogonal to the vertical direction (the arrow V in FIG. 12) and specifies portions which correspond to the minimum in the histogram and in which the number of pixels is a predetermined number of less as joint portions $C_{12}$, $C_{13}$ and $C_{14}$ of the item. Then, the correction unit 14 specifies regions adjacent to the regions specified as the joint portions as regions $B_{11}$, $B_{12}$, $B_{13}$ and $B_{14}$ where each of the parts is shown in the item image.

Figure 13:
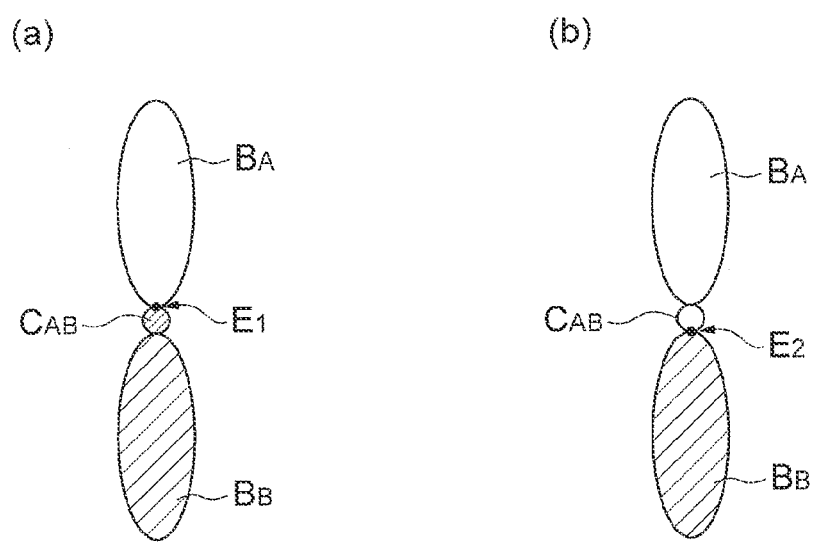
FIG. 13 is a diagram showing an example of setting a support position in a correction target region.

Setting of a correction target region and a support position in the case where an item includes a plurality of parts joined to each other through a joint portion in a manner that is able to swing is described hereinafter with reference to FIG. 13. As shown in FIG. 13(a), when one part $B_A$ and another part $B_B$ included in an item are joined through a joint portion $C_{AB}$, the correction unit 14 sets a region where at least the other part $B_B$ is shown (the shaded area in FIG. 13(a)) as the correction target region. The correction target region can include a region where the joint portion $C_{AB}$ is shown as shown in FIG. 13(a). In this case, the correction unit 14 specifies the joint end on the side of one part $B_A$ in the correction target region as the support position. The correction unit 14 can set any position in the region of the joint portion $C_{AB}$ as the support position. The support position may be the end $E_1$ on the side of one part $B_A$ in the joint portion $C_{AB}$ or the center of the region of the joint portion $C_{AB}$, for example.

Further, as shown in FIG. 13(b), when the correction target region (the shaded area in FIG. 13(b)) does not include the joint portion $C_{AB}$, the correction unit 14 specifies the end $E_2$ of the other part $B_B$ on the side of one part $B_A$ as the support position.

Note that, in the case where an item includes a plurality of parts joined through a joint portion, one part has a plurality of joint ends. In such a case, when a line connecting the joint portions at both ends of the part does not go through the center of gravity position, if the support position is set to the lower joint end among a plurality of joint ends and the tilt correction is made, the corrected state is different from the state where the item is actually worn. Accordingly, in this case, the support position for the correction target region where one part is shown is preferably set to the upper joint end among a plurality of joint ends.

Figure 14:
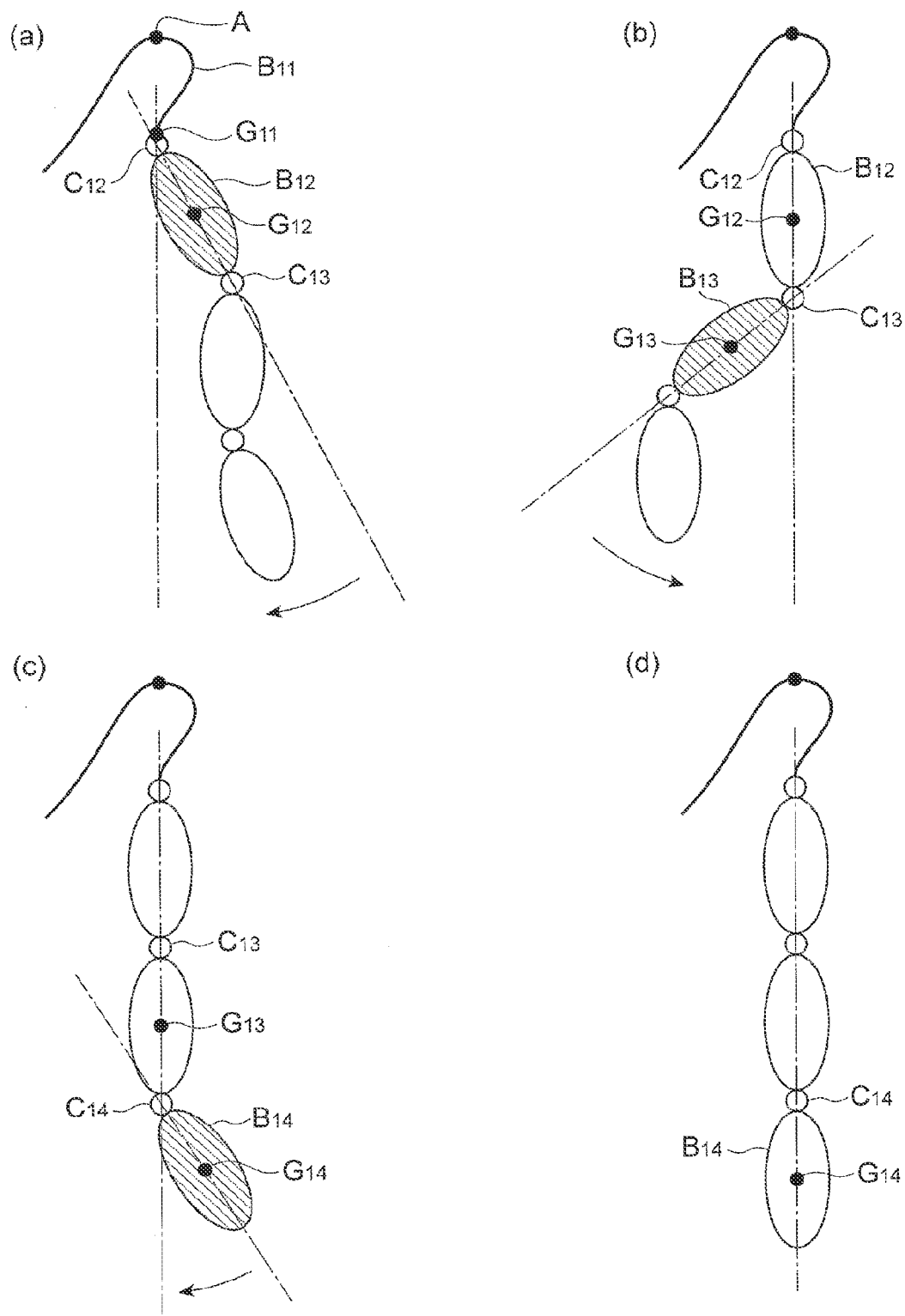
FIG. 14 is a diagram showing specifying a support position and a center of gravity position of each of parts being correction target regions and correcting the tilt of each of the correction target regions.

FIG. 14 is a diagram showing specifying the support position and the center of gravity position of each of parts being correction target regions and correcting the tilt of each of the correction target regions in the case where an item is made up of a plurality of parts. Note that, in the example of FIG. 14, the center of the joint portion is specified as the support position. Further, the example of FIG. 14 may be regarded as interpreting the joint portion as a point.

First, when a part includes an attachment portion, the correction unit 14 specifies the attachment portion as the support position of the part. In the example of FIG. 14(a), because a part $B_{11}$ has an attachment portion A, the correction unit 14 specifies the attachment portion A as the support position of the part $B_{11}$. Further, the correction unit 14 specifies a center of gravity position $G_{11}$ of the part $B_{11}$ using a known image analysis technique. Then, the correction unit 14 corrects the tilt of the part $B_{11}$ so that the direction of the center of gravity position with respect to the support position (the attachment portion A) is along the direction of gravity in the model image.

Further, when one part has a plurality of joint portions, the correction unit 14 specifies the joint portion that comes uppermost among the plurality of joint portions when the attachment portion is attached to the model so that the item is worn dangling down as the support portion. In the example of FIG. 14(a), the correction unit 14 specifies the support position in the part $B_{12}$ having a plurality of joint portions $C_{12}$ and $C_{13}$ to the joint portion $C_{12}$ that is at the upper position (on the attachment portion side).

Further, the correction unit 14 specifies the center of gravity position $G_{12}$ of the part $B_{12}$ using a known image analysis technique. Note that, although it is assumed that the mass is distributed uniformly over regions where parts (correction target regions) are shown when specifying the center of gravity position using a known technique in this embodiment, it may be assumed that the mass of all parts supported through a joint portion is distributed in the joint portion that is not specified as the support position when one part has a plurality of joint portions. In the example of FIG. 14(a), it can be assumed that the mass of all the other parts $B_{13}$ and $B_{14}$ supported through the joint portion $C_{13}$ is distributed in the joint portion $C_{13}$ that is not specified as the support position of the part $B_{12}$.

Then, as shown in FIG. 14(b), the correction unit 14 corrects the tilt of the part $B_{12}$ so that the direction of the center of gravity position $G_{12}$ with respect to the support position (the joint portion $C_{12}$) is along the direction of gravity in the model image. Note that, in the example of FIG. 14(a), the tilt of the uncorrected parts $B_{13}$ and $B_{14}$ is also corrected tentatively in accordance with the correction of the tilt of the part $B_{12}$.

Likewise, as shown in FIG. 14(b), the correction unit 14 specifies the joint portion $C_{13}$ as the support position of the part $B_{13}$ and further specifies a center of gravity position $G_{13}$ of the part $B_{13}$ using a known image analysis technique. Then, as shown in FIG. 14(c), the correction unit 14 corrects the tilt of the part $B_{13}$ so that the direction of the center of gravity position $G_{13}$ with respect to the support position (the joint portion $C_{13}$) is along the direction of gravity in the model image.

Further, as shown in FIG. 14(c), the correction unit 14 specifies the joint portion $C_{14}$ as the support position of the part $B_{14}$ and specifies a center of gravity position $G_{14}$ of the part $B_{14}$ using a known image analysis technique. Then, as shown in FIG. 14(d), the correction unit 14 corrects the tilt of the part $B_{14}$ so that the direction of the center of gravity position $G_{14}$ with respect to the support position (the joint portion $C_{14}$) is along the direction of gravity in the model image.

Figure 15:
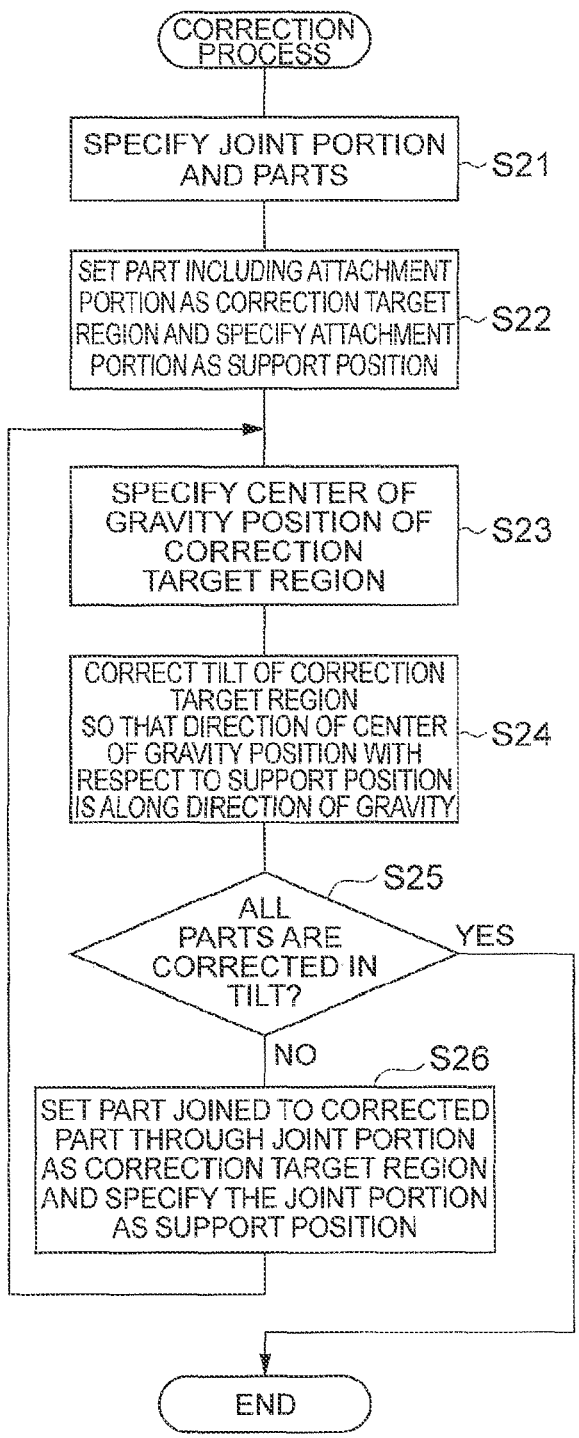
FIG. 15(a) is a flowchart when correcting the tilt of a plurality of parts included in an item in a sequential fashion.
FIG. 15(b) is a flowchart when correcting the tilt of a plurality of parts included in an item in a parallel fashion.
Figure 15:
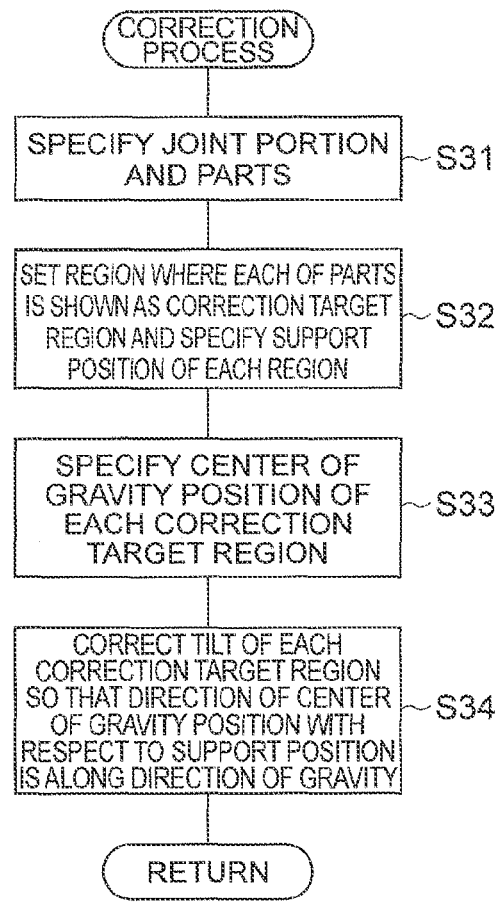

A procedure of correction in the case where an item includes a plurality of parts that are joined through a joint portion to be able to swing around the joint portion as the point of support is described hereinafter with reference to FIG. 15. FIGS. 15(a) and 15(b) are flowcharts specifically illustrating the correction process in Step S4 of the flowchart of FIG. 10(a).

FIG. 15(a) is a flowchart in the case where the tilt of a plurality of parts included in an item is corrected sequentially from the upper part. First, the correction unit 14 specifies a joint portion and a region where parts serving as correction target regions are shown in an image of an item (S21). Next, the correction unit 14 extracts a part including an attachment portion from a plurality of parts and sets a region where the part is shown as the correction target region and specifies the attachment portion of the part as the support position of the part (S22).

Then, the correction unit 14 specifies the center of gravity position in the correction target region using a known image analysis technique (S23). The correction unit 14 then corrects the tilt of the correction target region so that the direction of the center of gravity position with respect to the support position is along the direction of gravity in the model image (S24).

Then, the correction unit 14 determines whether the correction has been made to the tilt of all parts included in the item image (S25). When it is determined that the tilt of all parts has been corrected, the correction procedure ends. On the other hand, when it is not determined that the tilt of all parts has been corrected, the correction procedure proceeds to Step S26.

In Step S26, the correction unit 14 sets a region where a part that is joined to the part on which the tilt correction has been made through a joint portion is shown as the correction target region and specifies the joint portion as the support position (S26). Then, the procedure returns to Step S23, and the processing of Steps S23 to S26 is repeated until it is determined that the tilt of all parts has been corrected in Step S25.

Note that, although the tilt correction is made by setting a plurality of parts, sequentially from the upper part, to the correction target region in the flowchart shown in FIG. 15(a), the tilt correction may be made sequentially from the lower part.

FIG. 15(b) is a flowchart in the case where the tilt correction of a plurality of parts included in an item is performed in parallel. In this case, the correction unit 14 specifies a plurality of parts and joint portions of each of the parts in an item image (S31). Next, the correction unit 14 sets each of the regions where each of the parts is represented as the correction target region and specifies the attachment portion or the joint portion located at the upper part of each part as the support position of each correction target region (S32).

Then, the correction unit 14 specifies the center of gravity position in each correction target region using a known image analysis technique (S33). The correction unit 14 then corrects the tilt of each correction target region so that the direction of the center of gravity position with respect to the support position is along the direction of gravity (S34). By making corrections in this manner, the processing time is shorter than the case of sequentially correcting a plurality of correction target regions.

Figure 16:
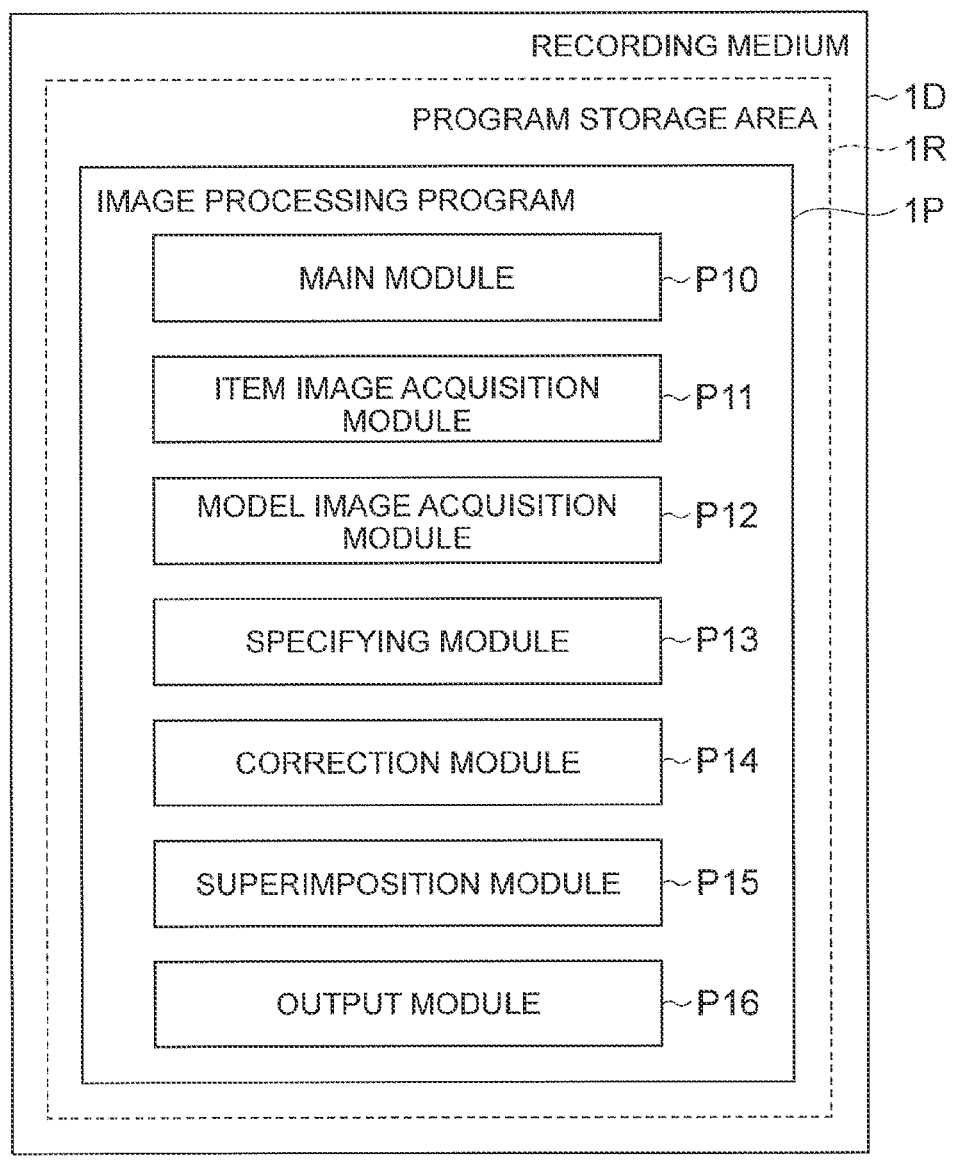
FIG. 16 is a diagram showing a configuration of an image processing program.

An image processing program that causes a computer to function as the image processing device 1 is described hereinafter with reference to FIG. 16. An image processing program 1P may be stored in a program storage area 1R on a recording medium 1D. The image processing program 1P includes a main module P10, an item image acquisition module P11, a model image acquisition module P12, a specifying module P13, a correction module P14, a superimposition module P15, and an output module P16.

The main module P10 is a part that exercises control over the image processing. The functions implemented by executing the item image acquisition module P11, the model image acquisition module P12, the specifying module P13, the correction module P14, the superimposition module P15 and the output module P16 are equal to the functions of the item image acquisition unit 11, the model image acquisition unit 12, the specifying unit 13, the correction unit 14, the superimposition unit 15 and the output unit 16 of the image processing device 1 shown in FIG. 1, respectively.

The image processing program 1P is provided through a storage medium such as CD-ROM or DVD-ROM or semiconductor memory, for example. Further, the information processing program 1P may be provided as a computer data signal superimposed onto a carrier wave over a communication network.

According to the image processing device 1, the image processing method, the image processing program 1P and a computer-readable recording medium storing the program described above, the tilt of the correction target region in the item region is corrected so that the direction of the center of gravity position of the correction target region with respect to the support position of the correction target region is along the direction of gravity in the model image, and the item region where the tilt of the correction target region has been corrected is output superimposed on the model image, and therefore the image that is closer to the state the item is actually worn can be displayed. Thus, the displayed image is not unnatural, which does not cause a feeling of strangeness to a user so much.

Further, according to the above-described embodiment, the item region in the item image is displayed superimposed on the model image after its tilt is appropriately corrected, and therefore there is no need to separately store the image of the item to be displayed superimposed. This allows reduction of the storage area.

Note that, the above embodiment is described using accessory such as pierced earrings as an example of the item. Because pierced earrings are worn through holes (pierced holes) in the earlobes of a person, they cannot be tried on at an actual shop or the like. Accordingly, it is very useful that they can be virtually tried on in the image processing device 1 according to this embodiment and a user can check them worn.

Further, because the proportion of parts to the whole size is large in pierced earrings, if an item image where the parts are unnaturally tilted is superimposed on a model image, a composite image is extremely unnatural. Because the tilt of the item image is corrected to be natural in the image processing device 1 according to this embodiment, it is very useful in the case where the item is pierced earrings.

Note that, although the image processing device 1 according to this embodiment has a significant effect when the item is pierced earrings as described above, the item is not limited to pierced earrings. The item may be those worn dangling down such as earrings and necklace charms, for example.

Hereinbefore, the present invention has been described in detail with respect to the embodiment thereof. However, the present invention is not limited to the above-described embodiment. Various changes and modifications may be made therein without departing from the scope of the invention.

Although the center of gravity position of an item is specified using a known image analysis technique on the assumption that the mass is uniformly distributed over the correction target region in the above-described embodiment, the mass of each of parts may be taken into consideration. For example, a database that stores a material used for items such as accessory, the mass per unit volume and the color of the material in association with one another may be prepared in advance, and the correction unit 14 may calculate the center of gravity position by specifying the material and the mass of each part based on information about the color of each part acquired from the item image. Further, the correction unit 14 may extract a keyword indicating a material from a webpage on which the item image is shown and specify the color of the material based on the above-described database and, when a part in the item image has that color, specify the part as being made of the material and specify the center of gravity position using information about the mass of the material.

REFERENCE SIGNS LIST

1 . . . image processing device, 11 . . . item image acquisition unit, 12 . . . model image acquisition unit, 13 . . . specifying unit, 14 . . . correction unit, 15 . . . superimposition unit, 16 . . . output unit, 21 . . . item image storage unit, 22 . . . model image storage unit, 23 . . . item information storage unit, 1D . . . storage medium, 1P . . . image processing program, P10 . . . main module, P11 . . . item image acquisition module, P12 . . . model image acquisition module, P13 . . . specifying module, P14 . . . correction module, P15 . . . superimposition module, P16 . . . output module

The invention claimed is:

1. An image processing device comprising:
   at least one non-transitory memory that stores computer program code; and
   a processor operable to access said memory and execute said computer program code, said computer program code comprising:
   item image acquisition code configured to cause said processor to acquire an item image displaying an item being an accessory worn dangling down;
   model image acquisition code configured to cause said processor to acquire a model image where a part on which the item is to be worn is shown;
   correction code configured to
      cause said processor to correct a tilt of a correction target region being at least a part of an item region being a region where an item is shown in the item image so that a direction of a center of gravity position of the correction target region with respect to a support position of the correction target region is along a direction of gravity in the model image, and
      adjust a size of the item region so that a ratio of a size of a part on which the item is to be worn in the model image and the size of the item region is substantially equal to a ratio of an actual size of the part on which the item is to be worn and an actual size of the item based on the size of the part on which the item is to be worn in the model image acquired from the model image, information about the actual size of the part on which the item is to be worn that is set in advance, the size of the item region in the item image acquired from the item image, and information about the actual size of the item that is stored in advance; and
   output code configured to cause said processor to output the model image and the item region so that the item region is displayed superimposed on the model image.

2. The image processing device according to claim 1, wherein
   the correction target region is a whole of the item region, and
   the support position is a position where an attachment portion of the item is shown in the item region.

3. The image processing device according to claim 1, wherein
   the item includes a first part and a second part joined to each other through a joint portion such that the first part and the second part are able to swing with respect to each other,
   the correction target region comprises the first part and the second part, and
   the support position is a joint end in the correction target region on a side of the first part.

4. The image processing device according to claim 3, wherein the correction code is further configured to cause said processor to specify a first region of the item region in which a length of the first region where an item is shown along a predetermined direction in the item image is shorter than adjacent regions of the item region adjacent to the first region in a predetermined range by at least a predetermined amount of difference as the joint portion and specify the adjacent regions as the first part and the second part.

5. The image processing device according to claim 1, wherein said computer program code further comprises specifying code configured to cause said processor to specify the direction of gravity in the model image based on information that can be acquired from the model image, and
   the correction code is further configured to cause said processor to correct the tilt of the correction target region based on the direction of gravity specified according to the specifying code.

6. The image processing device according to claim 1, wherein the correction code is further configured to cause said processor to, when an item image whose vertical direction is specified is acquired according to the item image acquisition code, specify an uppermost portion in the item region as the attachment portion.

7. The image processing device according to claim 1, wherein the output code is further configured to cause said processor to specify the part on which the item is to be worn in the model image by searching for the model image using a template indicating characteristics of the part on which the item is to be worn, and superimpose the item region on the model image so that a position where the attachment portion of the item is shown comes at the part on which the item is to be worn in the model image.

8. An image processing method executed by a computer, the method comprising:
   an item image acquisition step of acquiring an item image displaying an item being an accessory worn dangling down;
   a model image acquisition step of acquiring a model image where a part on which the item is to be worn is shown;
   a correction step of correcting a tilt of a correction target region being at least a part of an item region being a region where an item is shown in the item image so that a direction of a center of gravity position of the correction target region with respect to a support position of the correction target region is along a direction of gravity in the model image, and of adjusting a size of the item region so that a ratio of a size of a part on which the item is to be worn in the model image and the size of the item region is substantially equal to a ratio of an actual size of the part on which the item is to be worn and an actual size of the item based on the size of the part on which the item is to be worn in the model image acquired from the model image, information about the actual size of the part on which the item is to be worn that is set in advance, the size of the item region in the item image acquired from the item image, and information about the actual size of the item that is stored in advance; and an output step of outputting the model image and the item region so that the item region is displayed superimposed on the model image.

9. An image processing device comprising:

at least one non-transitory memory that stores computer program code; and a processor operable to access said memory and to execute said computer program code, said computer program code comprising:

item image acquisition code configured to cause said processor to acquire an item image displaying an item being an accessory worn dangling down;

model image acquisition code configured to cause said processor to acquire a model image where a part on which the item is to be worn is shown;

correction code configured to cause said processor to correct a tilt of a correction target region being at least a part of an item region being a region where an item is shown in the item image so that a direction of a center of gravity position of the correction target region with respect to a support position of the correction target region is along a direction of gravity in the model image; and output code configured to cause said processor to output the model image and the item region so that the item region is displayed superimposed on the model image, wherein the item comprises a first part and a second part joined to each other through a joint portion such that the first part and the second part are able to swing with respect to each other, wherein the correction target region comprises the first part and the second part, wherein the support position is a joint end in the correction target region on a side of the first part, and wherein the correction code is further configured to cause said processor to specify a first region of the item region in which a length of the first region where an item is shown along a predetermined direction in the item image is shorter than adjacent regions of the item region adjacent to the first region in a predetermined range by at least a predetermined amount of difference as the joint portion and specify the adjacent regions as the first part and the second part.

\* \* \* \* \*